(12) United States Patent
Strömberg

(10) Patent No.: US 8,049,714 B2
(45) Date of Patent: Nov. 1, 2011

(54) POINTING DEVICE

(76) Inventor: Rolf Strömberg, Järfälla (SE)

( * ) Notice: Subject to any disclaimer, the term of this patent is extended or adjusted under 35 U.S.C. 154(b) by 1844 days.

(21) Appl. No.: 10/312,959

(22) PCT Filed: Jul. 13, 2001

(86) PCT No.: PCT/SE01/01620
§ 371 (c)(1),
(2), (4) Date: Jul. 7, 2003

(87) PCT Pub. No.: WO02/06943
PCT Pub. Date: Jan. 24, 2002

(65) Prior Publication Data
US 2004/0169634 A1   Sep. 2, 2004

(30) Foreign Application Priority Data

Jul. 14, 2000   (SE) ........................... 0002698

(51) Int. Cl.
*G09G 5/00* (2006.01)
(52) U.S. Cl. ........................................ 345/156
(58) Field of Classification Search ............ 345/157; D14/402–410
See application file for complete search history.

(56) References Cited

U.S. PATENT DOCUMENTS

| | | | |
|---|---|---|---|
| 4,692,756 A | 9/1987 | Clark | |
| 5,086,296 A * | 2/1992 | Clark | 345/157 |
| 5,270,690 A | 12/1993 | Oberg | |
| 5,956,016 A | 9/1999 | Kuenzner et al. | |
| 6,094,190 A | 7/2000 | Kodim | |
| 6,208,328 B1 * | 3/2001 | Kawachiya et al. | 345/157 |
| 6,747,631 B1 * | 6/2004 | Sakamaki et al. | 345/157 |
| 6,809,661 B1 * | 10/2004 | Badarneh | 341/31 |

FOREIGN PATENT DOCUMENTS

| | | |
|---|---|---|
| EP | 0 320 044 | 6/1989 |
| EP | 0 796 756 | 9/1997 |
| JP | 2001-174288 | 1/2001 |
| JP | 2001-493571 | 7/2001 |

* cited by examiner

*Primary Examiner* — Tammy Pham
(74) *Attorney, Agent, or Firm* — Renner, Otto, Boisselle & Sklar, LLP

(57) ABSTRACT

The present invention includes a device suitable for the displacement of a cursor or its equivalent on a monitor. The device comprises a loop (10), mounted in tension around and between two separate shaft devices (20, 30) that can be translated, at least one of which is arranged such that it can be displaced and rotated.

15 Claims, 12 Drawing Sheets

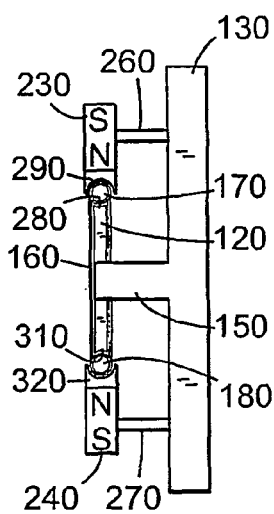
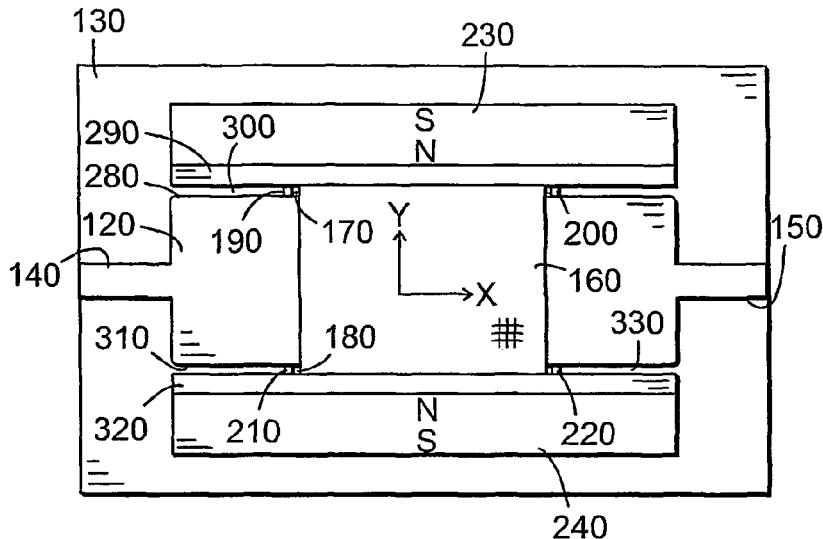
FIG. 2  FIG. 2a
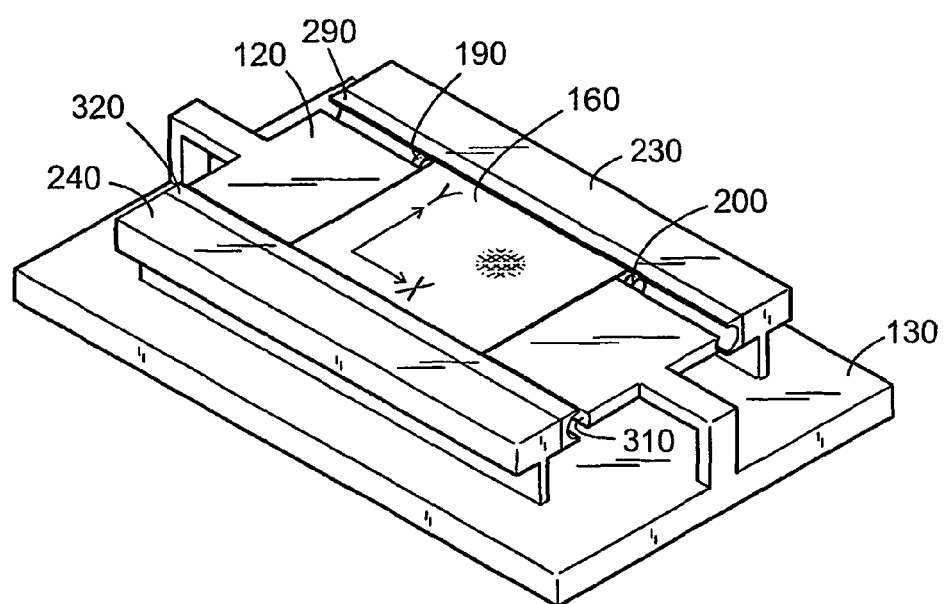
FIG. 2b

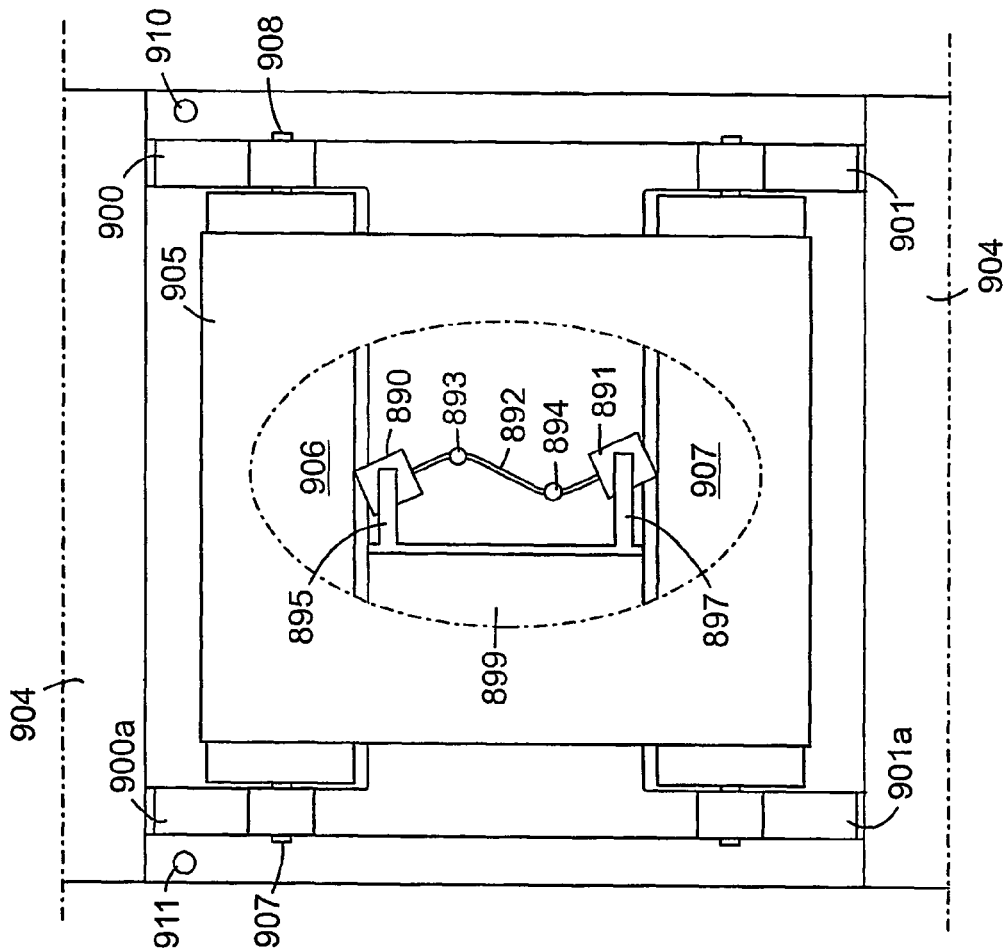
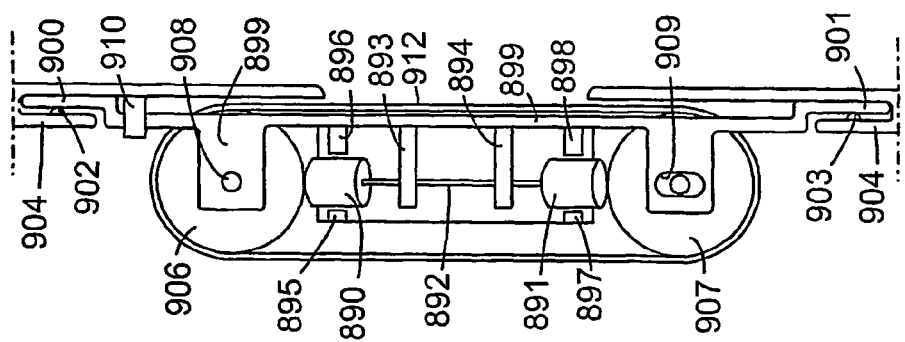

POINTING DEVICE

TECHNICAL AREA

The invention concerns a device comprising a base with a pointing surface that by means of a finger or equivalent can be moved within a pointing area of the device, preferably for displacing a cursor or equivalent on a display operatively connected to the device, whereby the pointing surface comprises one side of a loop device that, in order to make backwards and forwards motion possible in a first direction, is mounted for circulatory motion around support means arranged at av mutual distance, and that, in order to make forwards and backwards motion possible in a second direction that is perpendicular to the first direction, is mounted displaceable relative to the base.

THE PRIOR ART

The most common pointing device for computers is the widely known mouse, which is used for displacing what is known as a cursor on the monitor or display of a computer. However, the mouse has the principal disadvantage that the user must move a hand away from the keyboard when using it, something that is time-consuming and, furthermore, can introduce certain medical problems. The mouse is also unsuitable for use with what are known as notebook computers, since these are often used in situations in which a natural surface for use of a mouse in not available. An alternative pointing device, the tracker ball, has thus often been integrated into the keyboard on notebook computers, often in front of the space bar. Many people experience that the tracker ball gives lower speed and poorer comfort than the mouse when controlling the cursor, depending on, among other factors, that the diameter of the tracker ball, and thus the area of the ball that can be reached with the fingers, necessarily must be small.

A further solution is a plate, a "touch-plate", that detects the position of the contact surface of the finger tip on the touch-plate. Advantages are a low cost of manufacture and a low thickness, which is why the touch-plate can be used in notebook computers.

One disadvantage is that the touch-plate does not in general allow two fingers to collaborate for control of the cursor, since two contact points on the touch-plate can give rise to false detection. A further disadvantage is that it is often difficult to move the contact surface of the finger against the touch-plate slowly without the motion becoming jerky, arising from a "stick-slip" effect that depends on dampness on the finger tip. Furthermore, the subjective feeling of drawing a finger over a fixed area is often assessed to be poorer than moving an object in reality with the tip of the finger, and wear damage has also been reported on the fingers of the user. One disadvantage is that it is only the contact surface of the finger on the touch-plate, and not the real displacement of the finger relative to the touch-plate, that is detected. This involves errors in the detection in the case in which the finger "rolls" against the touch-plate, as can arise if the touch-plate is located in front of the space bar of the keyboard and the user attempts to displace the cursor upwards and to the left on the monitor using the right thumb. In this case, the cursor often does not move at all in the direction desired and occasionally even in the opposite direction. Furthermore: when the user places a finger onto, or removes a finger from, the touch-plate, the calculated centre of the contact surface (its "centroid") is often displaced somewhat during a short period. This must not give rise to any noticeable displacement of the cursor. If this problem is to be eliminated, a delay should be introduced into the detection algorithm that minimises displacement of the cursor when the position of the centroid changes rapidly. Unfortunately, this gives rise in practice to a considerably poorer subjective feeling when using the touch-plate, since displacement of the finger on the touch-plate does not in practice give a sufficiently rapid response of the cursor on the monitor. Other disadvantages also exist. These disadvantages in combination reduce significantly the usefulness of the touch-plate.

A further solution is a rod that can be displaced and rotated around its axis of symmetry that is often placed below the space bar. Rotation of the rod displaces the cursor in a vertical direction and translation of the rod in a horizontal direction displaces the cursor in a horizontal direction on the monitor. Such a solution provides efficient displacement of the cursor, since it lacks the above-mentioned disadvantages of mouses, tracker balls and touchplates. However, the requirements of the rod for space, in particular for its diameter, decreases is acceptability for use in notebook computers. A large diameter of the rod occupies too large a space, while reducing the diameter to a few millimeters reduces its efficiency when in use, since the surface of the rod that can be reached by the user becomes far too small.

A flexible loop is suggested in U.S. Pat. No. 4,692,756 by Clark, placed under tension between two fixed rounded edges of a base plate. The loop can rotate over the edges of the support plates and it can slide along the edges of the base plate. One disadvantage is that the loop is not experienced as infinite, a button fixed to the loop is used to displace the loop, possibly due to the fact that the button is required to make a sufficiently good grip in order to overcome friction against the edges of the base plate. Furthermore, such a device can hardly be given as thin an execution as is desirable in notebook computers; this would increase the friction of the loop against the base plate too much. Furthermore, the inventor has, in a later patent, reported problems with play.

A device according to the present invention is intended to eliminate all of the above-mentioned disadvantages.

SUMMARY OF THE INVENTION

According to an aspect of the invention, at least one of the said support means comprises a shaft or similar device that can be rotated and displaced along its axis relative to the base.

According to another aspect of the invention, a flexible loop passes over two rods that can be rotated. The rods place the loop under tension with a certain force, and the loop is thus held extended. Above the upper side of the loop, "the pointing surface", there is a plate that is fixed attached to the base with an open region that allows the user to displace the loop by, for example, freely pushing or pulling with a finger the pointing surface in two mutually perpendicular dimensions, which can be termed the x-axis and the y-axis. This gives rise through detection to equivalent motion of a cursor on a monitor.

The rods are axially oriented parallel to the x-axis and mounted such that they can be displaced and rotated relative to the base, or mounted such that they can be rotated relative to a trolley, which is in turn, mounted such that it can be displaced along the x-axis relative to the base. When the pointing surface is displaced along the x-axis, the rods and, where appropriate, the trolley are displaced along the x-axis relative to the base. When the pointing surface is displaced along the y-axis, the loop rolls over the rods, which also rotate. The loop encloses a base plate that is fixed attached to the base or to the trolley. Buttons for a click function may be placed at the side of the open region; alternatively, click can take place by pressing the pointing surface, and in this way also the base plate, down.

BRIEF DESCRIPTION OF DRAWINGS

FIGS. 2, 2*a* and 2*b* show an embodiment with magnets:
FIGS. 8, 8*a*, 9, 10 and 11 show different methods of separating the rods with rollers;
FIGS. 15 and 15*a* show an embodiment having one translatable and rotable rod.

DETAILED DESCRIPTION OF EMBODIMENTS

Figures 1, 1A:
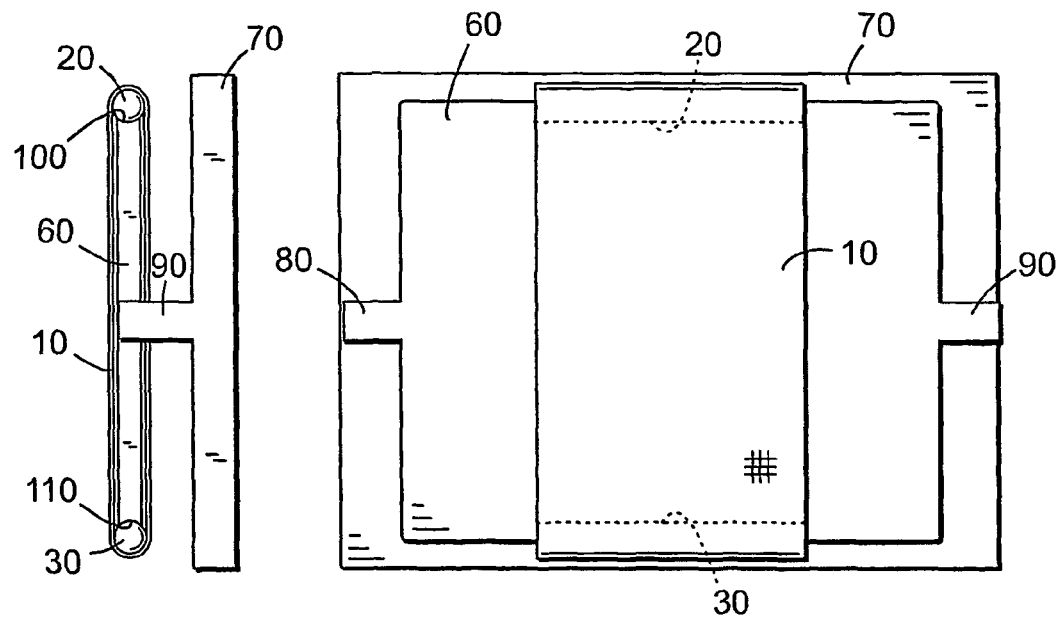
FIGS. 1, 1*a* and 1*b* show a simple embodiment of the present invention.
Figure 1B:
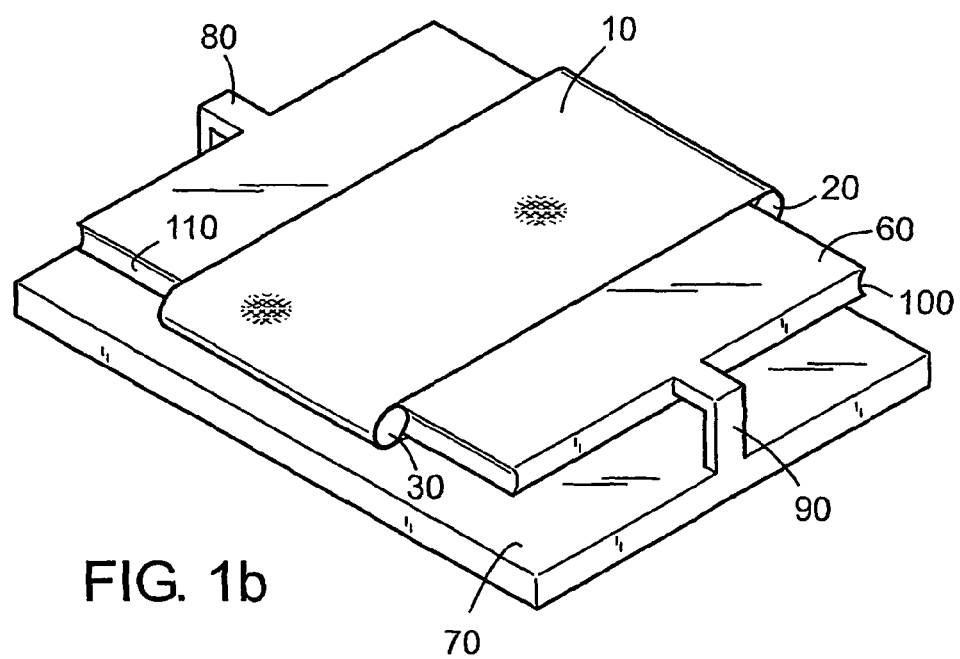

A first embodiment is shown in FIGS. 1 and 1*a*. A loop 10 is placed under tension between two highly polished rods 20 and 30, executed in, for example, steel. The length of the rods should be at least equal to the length of the loop. A base plate 60 is placed between the rods 20 and 30, executed in a material that gives low friction with the rods 20 and 30. The base plate 60, which is fixed attached to a base 70 by the struts 80 and 90, has concave grooves 100 and 110 at its edges, in which the rods 20 and 30 can slide and also rotate. The loop 10 rotates around the rods 20 and 30, which also rotate, when the user displaces the upper surface of the loop 10, the "pointing surface", along the y-axis relative to the base plate 60. The loop 10 and the rods 20 and 30 are translated as a complete unit along the x-axis, when the user displaces the pointing surface along the x-axis relative to the base plate 60. The loop in this embodiment is tangentially elastic whereby it is placed under tension around the rods 20 and 30 in such a way that play is eliminated.

Figure 12:
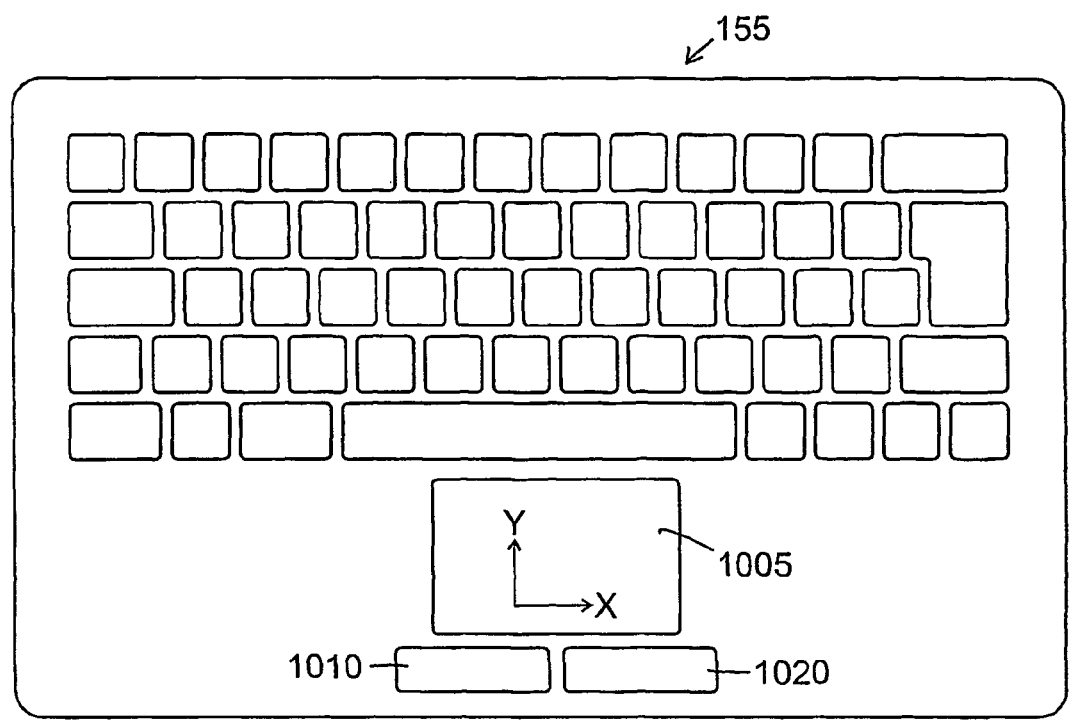
FIG. 12 shows examples of the location of click buttons.

FIG. 12 shows the device described above integrated into a keyboard 155. Note the opening 1005 in the keyboard, which limits the area of the upper surface of the loop, the pointing surface, that can be reached by the user.

One disadvantage of the embodiment described above is that the rods may give friction that is too high against the concave grooves of the base plate, whereby displacement of the loop can become uncertain. An embodiment in which this problem is eliminated is therefore shown in FIGS. 2, 2*a* and 2*b*. A loop 160 is placed under tension between two rods 170 and 180, executed in some material that can be attracted by magnetism. It is not possible to stretch the loop 160 in this and in the following embodiments. Both of the rods 170 and 180 are provided at their ends with stops 190, 200, 210 and 220, such that the loop 160 cannot loose contact with the rods 170 and 180. A first longitudinal magnet 230 is placed outside of the rod 170, and a second longitudinal magnet 240 is placed outside of the rod 180. The longitudinal magnet 230 is magnetised in such a manner that one pole (for example, the North pole, as shown here) faces the rod 170, which is thus attracted to the magnet 230 with the same force independently of its position along the magnet 230. The same is also true for rod 180 with respect to the magnet 240. A base plate 120 is placed between the rods 170 and 180, which base plate is fixed attached to a base 130 by the struts 140 and 150. The magnets 230 and 240 are fixed attached to the base 130 by the struts 260 and 270, respectively. One edge 280 of the base plate forms, together with a non-magnetic fixture 290 fixed to the magnet 230, a longitudinal space 300, whereby the rod 170 can rotate around its longitudinal axis and can be displaced along the x-axis parallel to its longitudinal axis, but cannot be displaced to any significant degree along the y-axis relative to the base plate 120. The opposite edge 310 of the base plate 120 forms, together with a non-magnetic fixture 320 fixed to the magnet 240, a longitudinal space 330, whereby the rod 180 can rotate around its longitudinal axis and can be displaced parallel to its longitudinal axis, and it can also be displaced a few millimeters along the y-axis relative to the base plate 120. The reason that the space 330 has an extended cross-section is that the rod 180 must be able to absorb any variations that occur in the circumference of the loop 160.

The loop 160 rotates around the rods 170 and 180, which also rotate, when the user displaces the upper surface of the loop 160 relative to the base plate 120 along the y-axis. The loop 160 and the rods 170 and 180 are translated as a complete unit along the x-axis when the user displaces the upper side of the loop 160 along the x-axis relative to the base plate 120.

One advantage of this embodiment is the essentially friction-free mounting of the rods 170 and 180. This, together with the fact that the outwardly directed forces of the magnets 230 and 240 are evenly distributed over the complete length of the rods 170 and 180, which therefore do not need to have any significant rigidity and can be executed with a small diameter, means that this embodiment is appropriate for use in, for example, notebook computers.

Figures 3, 4:
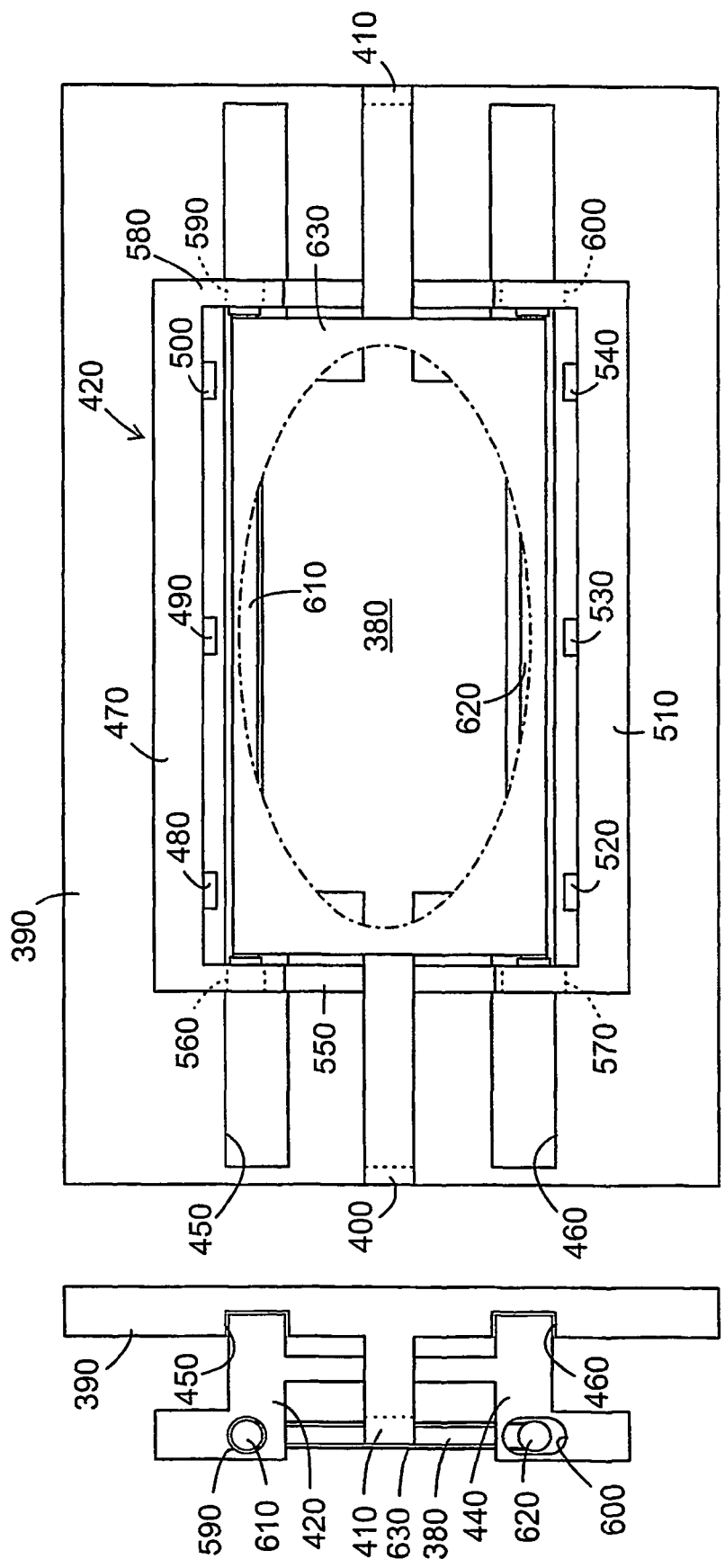
FIGS. 3 and 4 show an embodiment with a trolley.

A fourth embodiment is shown in FIG. 3 and FIG. 4, in which the loop 630 has been cut away in an ellipse for the purposes of clarity. A base plate 380 is fixed attached to a base 390 by the struts 400 and 410. A trolley 420 is mounted such that it can be slid along the base 390 by two sliding strips 430 and 440 attached to the trolley, which run in corresponding tracks 450 and 460 in the base 390. A number of magnets, in this case three 480, 490 and 500, are fixed attached to one long edge 470 of the trolley, and three magnets 520, 530 and 540 are also fixed attached to the second long edge 510 of the trolley. One short edge 550 of the trolley is provided with two holes 560 and 570, shown with dashed lines in FIG. 4, and the opposite short edge 580 of the trolley has corresponding holes 590 and 600. The holes 560 and 590 are circular, while the holes 570 and 600 have an extended cross-section, which means that the rod 610 can rotate around its longitudinal axis but cannot be displaced along the y-axis, while the rod 620 has a certain mobility along the y-axis, in addition to being able to rotate around its longitudinal axis. This means that it is able to absorb any variations that occur in the circumference of the loop 630. The outwardly acting force on the rods 610 and 620 is supplied by the magnets 480, 490, 500, 520, 530 and 540, which attract the rods 610 and 620, such that the loop 630 is held under tension. The loop 630 rotates around the rods, which also rotate when the user displaces the upper surface of the loop 630 along the y-axis relative to the base plate. The loop 630, the trolley 420 and the rods 610 and 620 are translated as one unit along the x-axis when the user displaces the upper surface of the loop 630 along the x-axis relative to the base plate 380.

Figure 5:
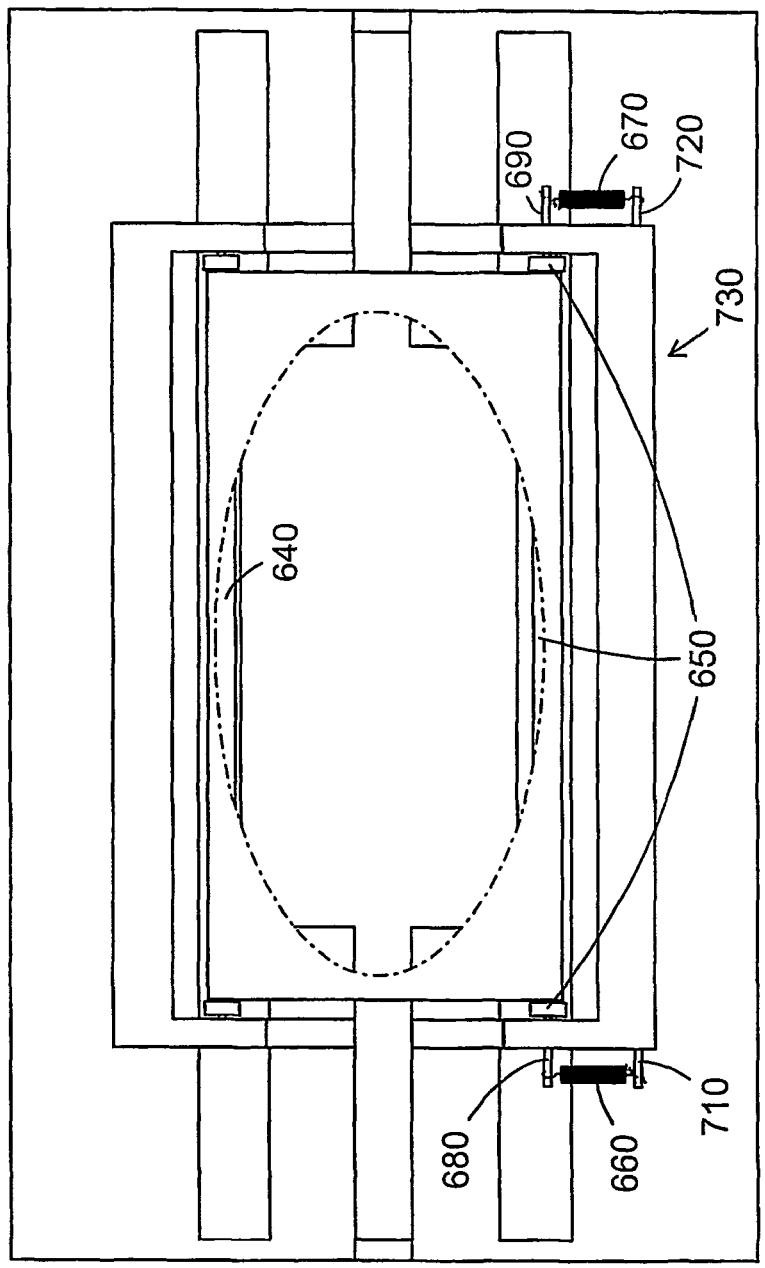
FIGS. 5 and 5*a* show an embodiment including trolley and spiral springs.
Figure 5A:
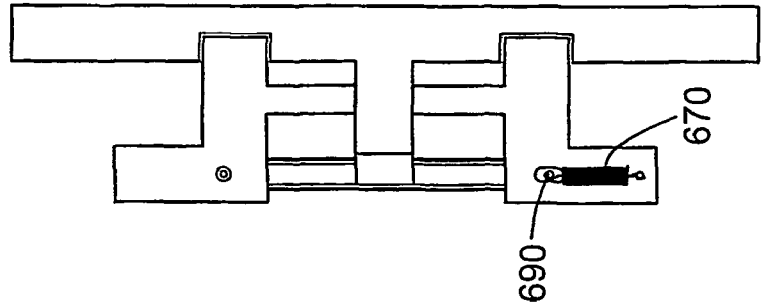

A fifth embodiment is shown in association with FIGS. 5 and 5a. The mechanical construction is the same as previous embodiments, but the separating force for the rods 640 and 650 is provided by the two spiral springs 660 and 670, each of which has one end that encircles the mounting pins 680 and 690 that are situated in the ends of the rod 650, and each of which has a second end that encircles the pins 710 and 720, fixed attached to the trolley 730. Since the diameter of the pin mountings 680 and 690 is small, rolling friction is minimised.

Figure 6:
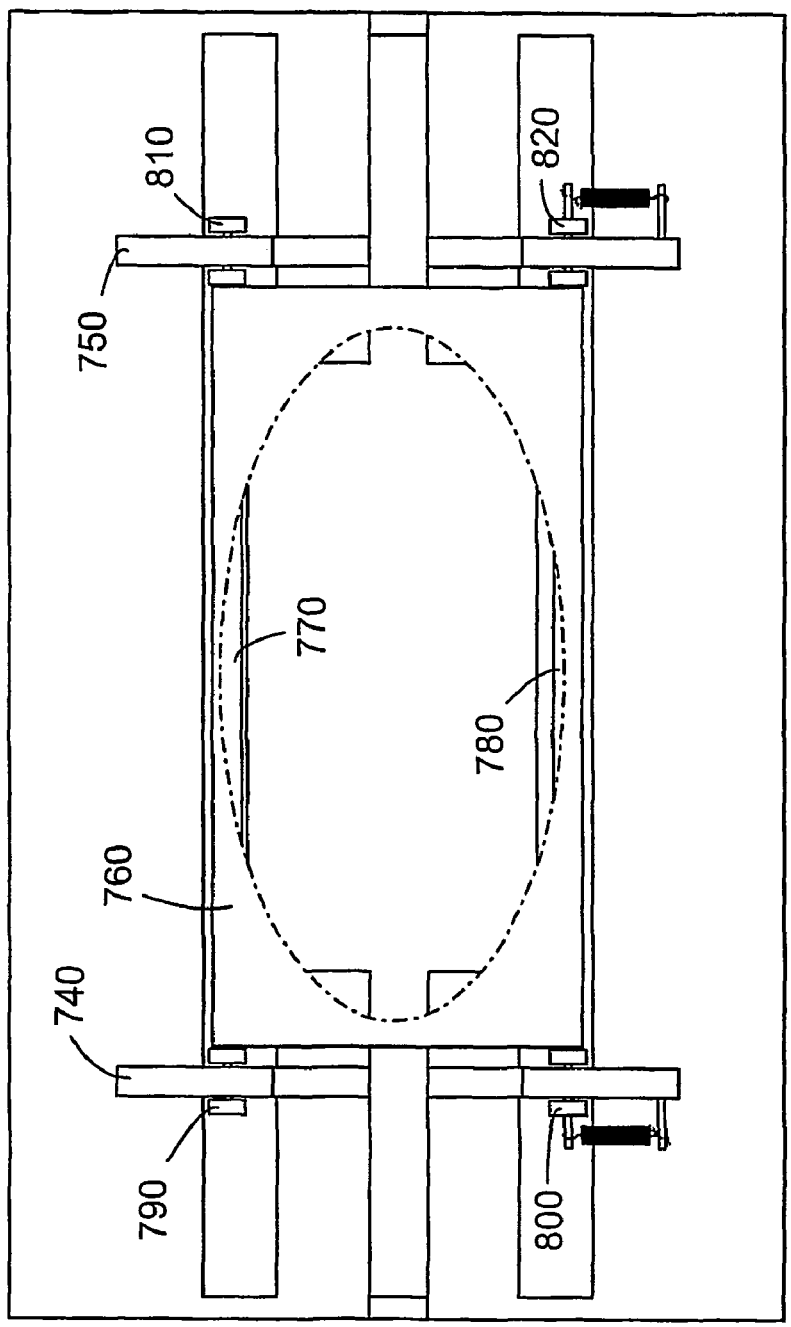
FIGS. 6 and 6*a* show a divided trolley.
Figure 6A:
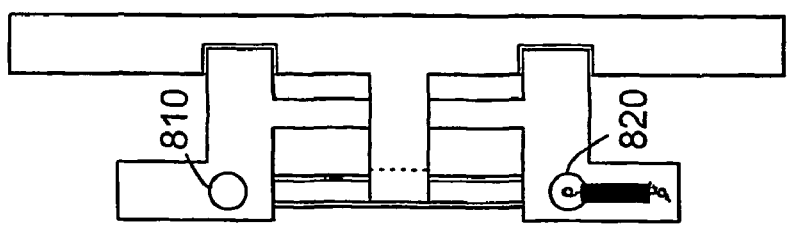

A sixth embodiment is shown in association with FIGS. 6 and 6a. The mechanical construction is the same as that of previous embodiments with the difference that the trolley is divided into two parts, 740 and 750, located on each side of the loop 760. The parts 740 and 750 are prevented from coming loose from the rods 770 and 780 by the stops 790, 800, 810 and 820, fixed attached to the ends of the rods 770 and 780. Since the parts 740 and 750 provide the same functionality as a single trolley, the parts 740 and 750 can be defined as a device that is equivalent to one trolley.

Figure 7:
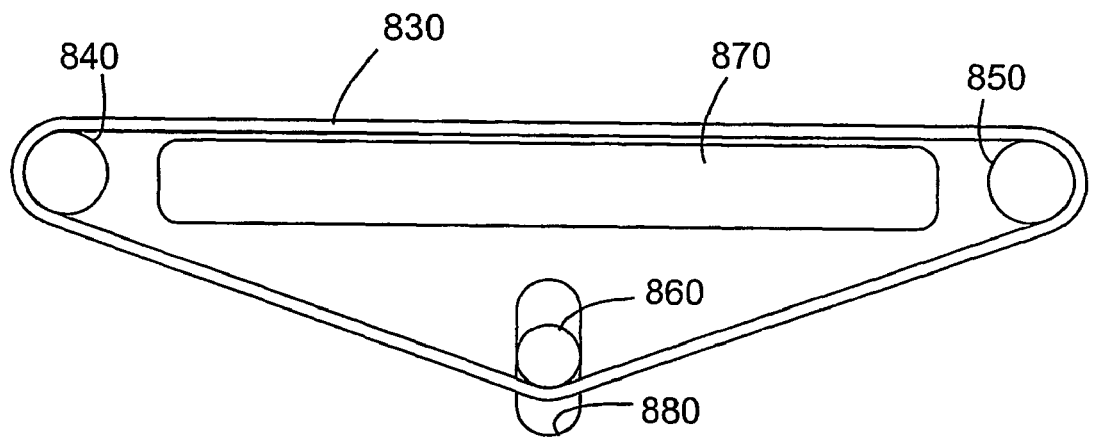
FIG. 7 shows a method of placing the loop under tension using a third rod.

A further embodiment is shown in FIG. 7, solely in an end-on view, and only those parts that are necessary for understanding. The loop 830 is placed under tension between three rods labeled 840, 850 and 860. The rods 840 and 850 are not mobile in a radial direction, but mounted on a trolley (not shown) such that they can rotate. The loop 830 also runs over a base plate 870, as it does in other embodiments. The loop 830 is placed under tension by the weight of the rod 860, which is mounted such that it can rotate in an extended hole 880 in the trolley, which is otherwise not shown in the figure. The rod can also be displaced in the vertical direction, in order to be able to absorb variations in the circumference of the loop 830.

The loop 830 rotates around the rod 860 and around the rods 840 and 850, which also rotate, when the user displaces the upper surface of the loop 830 along the y-axis relative to the base plate 870. The loop, the trolley (not shown) and the rods 840, 850 and 860 are all translated as one unit along the x-axis when the user displaces the upper surface of the loop 830 along the x-axis relative to the base plate 870.

An embodiment is shown in FIGS. 8 and 8a in which rollers separate the rods. The loop 905 is shown cut-away for the purposes of clarity. The rollers 890 and 891 are mutually connected by a steel wire 892. The steel wire 892 is arranged in an S-shape, and is held in place by the pins 893 and 894, which have holes (not shown) that pass through them, executed in such a manner that the steel wire is held in place from a radial point of view while being allowed to rotate freely. The rollers 890 and 891 are held in place vertically by the protrusions 895-898. These protrusions are, as are the pins 893 and 894, placed in connection with a base plate/trolley 899, which can slide along the x-axis by the tongues 900, 900a, 901 and 901a against the longitudinal slide ridges 902 and 903, while the motion is limited by the pins 910 and 911. The longitudinal slide ridges 902 and 903 are fixed attached to a base 904 that, for example, may constitute the cover of a laptop computer. The loop 905 can roll over the rods 906 and 907, which are mounted such that they can rotate on the base plate/trolley 899. The rod 906 is held radially in place by the mounting pins 907 and 908, situated in corresponding holes in the base plate/trolley 899. The rod 907 is also mounted such that it can rotate in the base plate/trolley 899, but the hole 909 is in this case extended, such that the rod 907 can maintain the loop 905 in tension despite variations in its circumference.

When the user displaces the upper surface of the loop 905, the "pointing surface" 912, along the y-axis, both the rods 906 and 907 rotate, as do the rollers 890 and 891, essentially free of friction. When the user displaces the pointing surface 912 along the x-axis, all mechanical parts that are not fixed attached to the base 904 are displaced along the x-axis.

Figure 9:
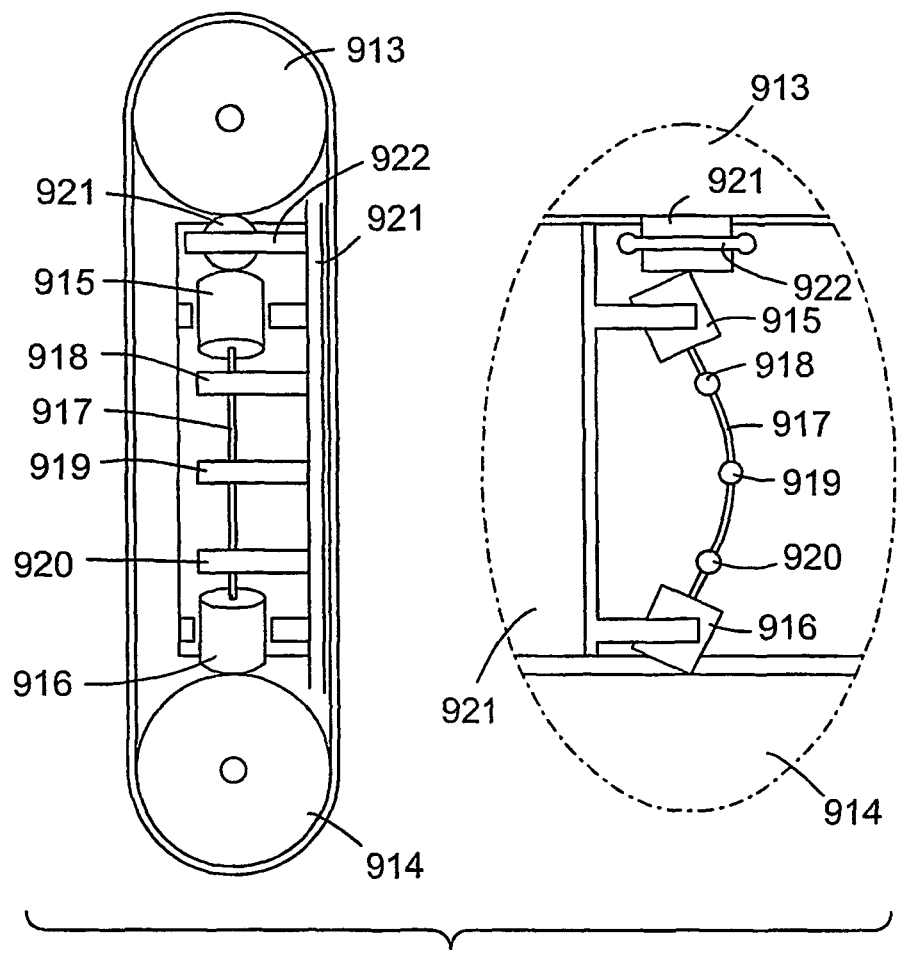

FIG. 9 shows only the cut-away region of a variation of the mechanical structure shown in FIG. 8. The difference lies in the arrangement of the rollers between the rods 913 and 914. Two rollers 915 and 916 are connected by a steel wire 917. The steel wire is arranged into a C-shape, and is held in place by the pins 918, 919 and 920, which have holes (not shown) that pass through them, executed in such a manner that the steel wire 917 is held in place while being allowed to rotate freely. A further roller 921 is located between the roller 915 and the rod 913, and this roller is held in place by the frame 922. The roller 921 has its axis of rotation parallel to the rod 913, and is required in order to transfer correctly the peripheral motion between the rods. The frame 922 and the pins 918-920 are connected with a base plate/trolley 921 in the same way as in the previous embodiment, and the rollers 915 and 916 are held in place vertically by the same means as has been shown in the previous embodiment.

Figure 10:
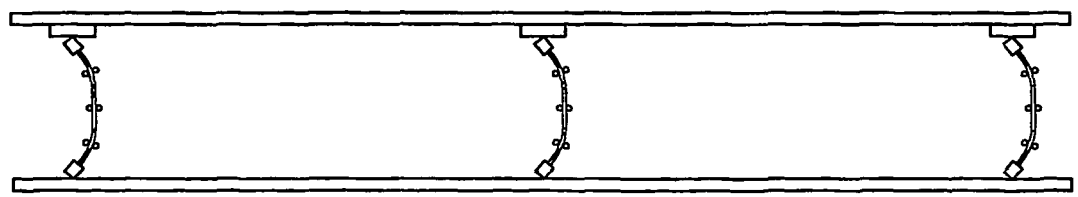

Many variations are possible. FIG. 10 illustrates how several sets of rollers can be used along the rods, making the use of very thin rods possible. Furthermore, the steel wires between the rollers shown in FIGS. 8, 8a, 9 and 10 may be replaced with spiral springs (not shown).

Figure 11:
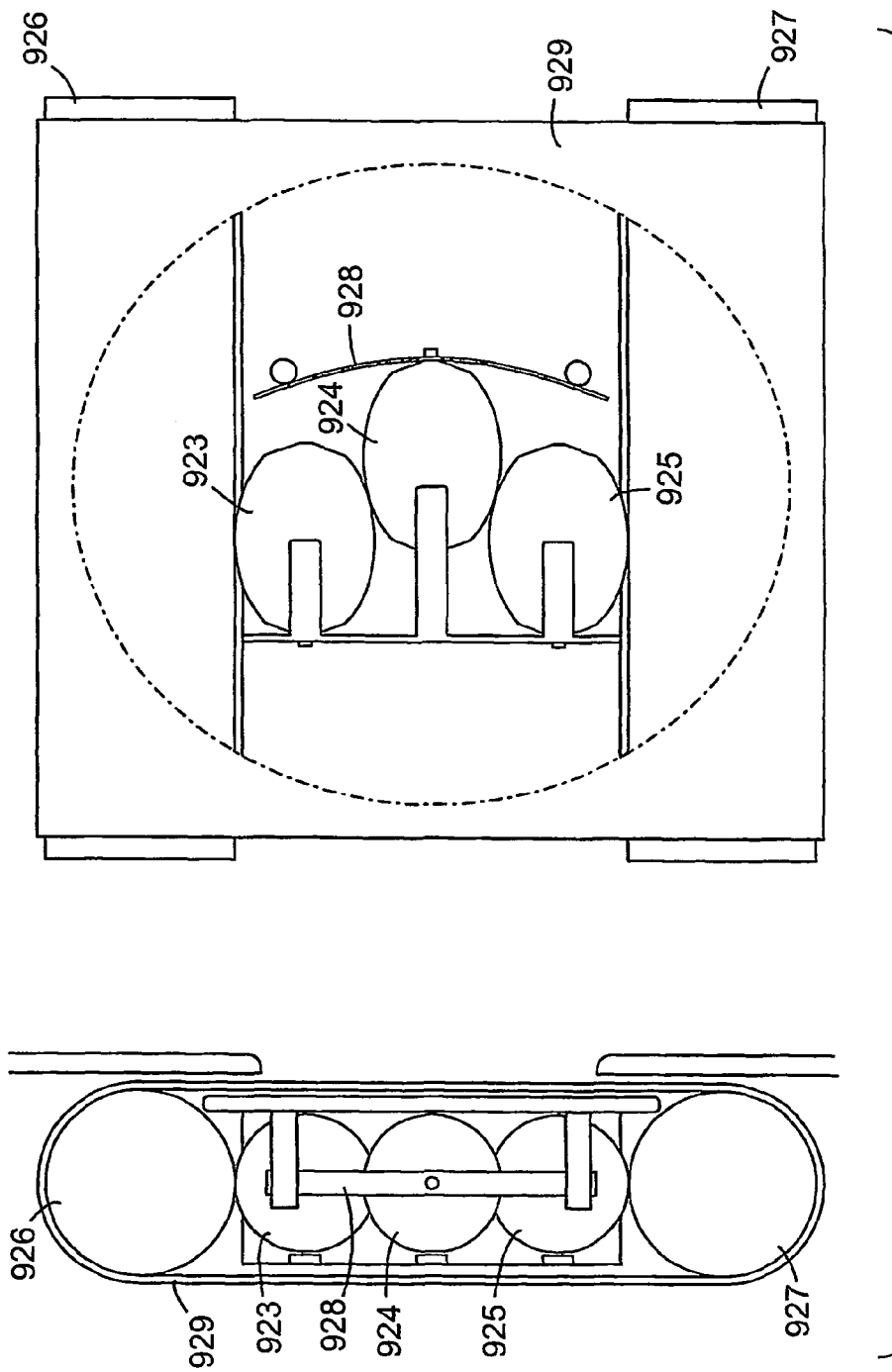

Another example in which rollers 934, 924 and 925 are used is shown in FIG. 11. The plate spring 928 presses the rollers against each other such that a separating force that acts outwards is obtained between the rods 926 and 927, whereby the loop 929 is placed under tension. It is clear that several rollers can be added to achieve greater distance between the rods (not shown). The number of rollers, however, must be odd, in order to transfer the peripheral motion in the correct manner between the rods.

The extended rollers shown in FIG. 11 may be replaced by spheres.

The advantage of the embodiments with rollers between the rods described above is that very low friction is generated. This makes use in laptop computers very appropriate, since the diameter of the rods, and thus the thickness of the complete device, can in practice be made to be very small.

All pointing devices for computers must be capable or achieving what is known as a "click" function, which for the most part means that some activity is initiated in the computer. On a mouse, for example, at least one button on its upper surface may be pressed down. In a device according to the present invention, the possibility of performing a click function may be achieved by placing buttons at the side of the pointing surface 1005, as is shown in FIG. 12. Pressing down of the button 1010 achieves what is known as a primary click, while button 1020 achieves what is known as a secondary click. Further buttons can, naturally, be added.

Figure 13:
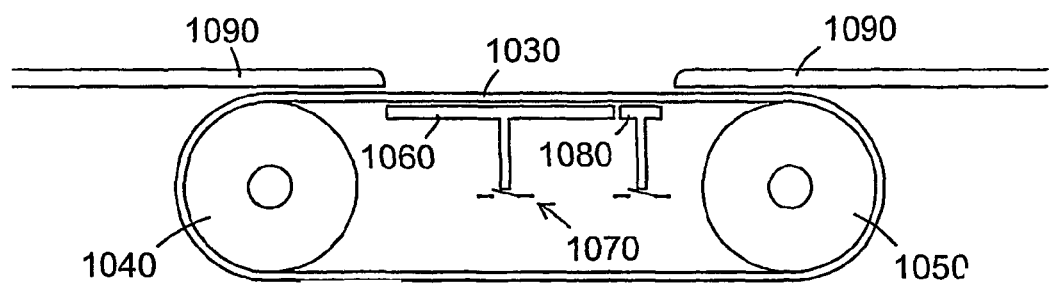
FIG. 13 shows click buttons under the pointing surface.

The base plate under the pointing surface may also constitute one or several buttons. A loop 1030 is shown in FIG. 13 placed under tension between the rods 1040 and 1050. The base plate has the form of a first plate 1060 that is connected to the contact 1070. The plate 1060 is mounted (not shown) such that it can slide vertically relative to the base, while the contact 1070 is fixed attached to the base (not shown). When the user presses a finger against that part of the pointing surface that is above the plate 1060 with a certain minimum force, the mobile plate 1060 is displaced approximately 0.5 mm downwards whereby the contact 1070 is closed and a primary click, for example, occurs. The advantage of this arrangement is that the user does not need to move the finger away from the loop 1030 when producing a primary click. FIG. 13 shows in addition a second, similar button 1080 that can be used for what is known as a secondary click.

It may be suitable in all embodiments of the present invention to wholly or partially coat the outer surface of the loop with a thin layer of flexible material, for example, soft rubber, which increases the friction between it and the user's finger, making displacement of the loop easier.

Figure 14:
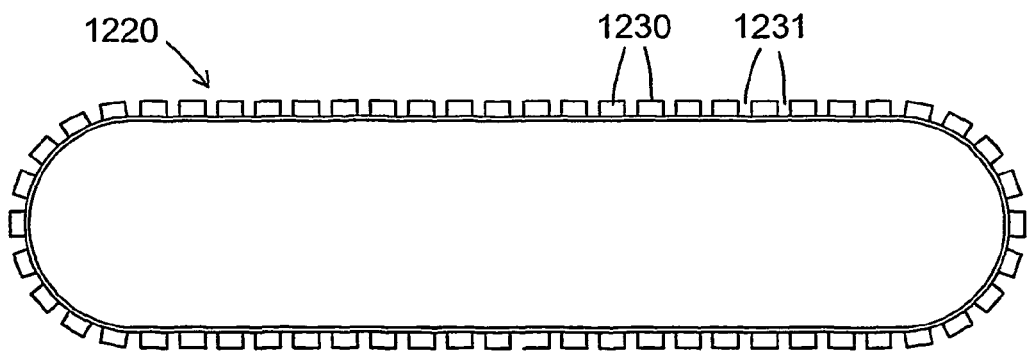
FIG. 14 shows a cross-section of a loop with separated longitudinal ridges.

A thickened loop 1220 is shown in end-on view in FIG. 14, with a number of longitudinal rods 1230 on the outer surface of the loop. This makes it easier for the loop to maintain its shape during sideways displacement, while at the same time the sensitivity of the loop around the rods is maintained, which is an advantage in all displayed embodiments. The rods 1230 can be said to define a pointing surface that is arranged in association with the loop, and they can also be regarded as part of the loop. In this case, the loop can be said to have a number of longitudinal grooves 1231.

Many modifications can be envisaged. The loop in all executions can wholly or partially consist of individual links with, for example, the same mutual connection as the links in many wrist-watch arm straps. A pointing surface is defined also in this case, as is the case independently of how the loop and the associated mechanical structure is designed in detail.

The loop may also consist wholly or partially of cloth or other material.

The rods may be executed as cylinders in order to, for example, save weight. The function, however, is the same as that of solid rods, whereby the cylinders can be regarded as devices that are equivalent to the solid rods.

Figure 16:
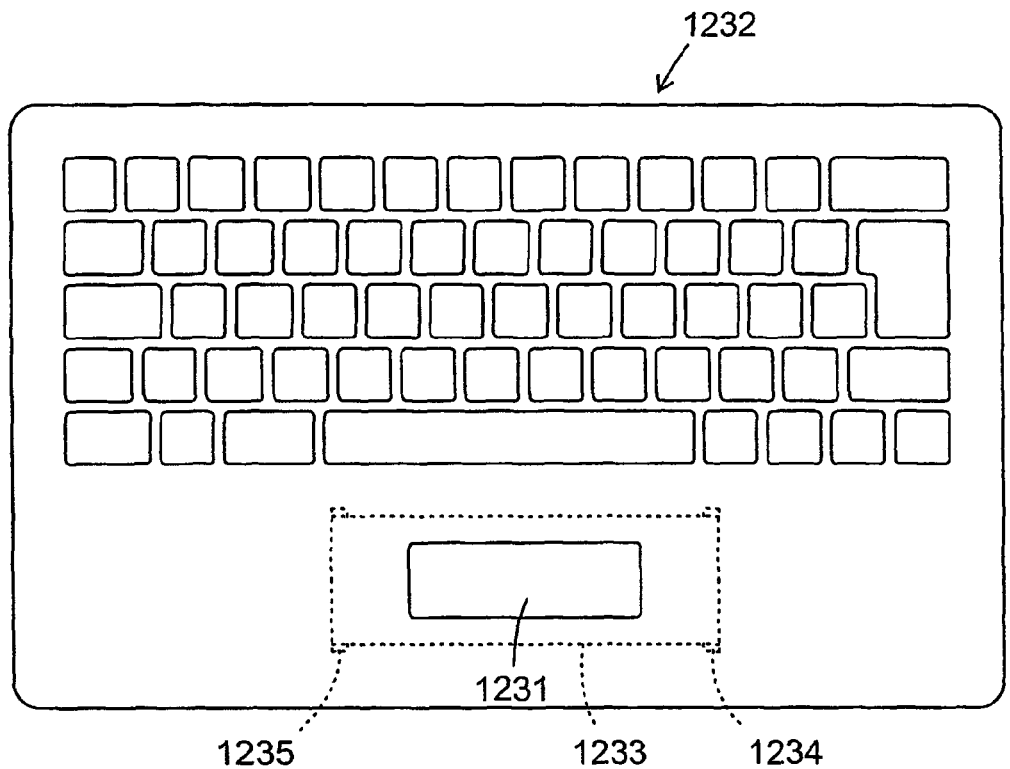
FIG. 16 shows a loop with rods arranged with the longitudinal axis along the y-axis.

Although all embodiments have been shown with the rods axially oriented along the x-axis, the rods may also be oriented along the y-axis as is shown schematically in FIG. 16, in which a keyboard 1232 is shown, with a pointing surface 1231. The loop 1233 and the rods 1234 and 1235 are shown with dashed lines since they are hidden. Displacement of the loop 1233 such that the rods 1234 and 1235 rotate, here gives rise to displacement of a cursor along the x-axis on the monitor. Displacement of the loop 1233 along the axial direction of the rods gives rise to displacement of the cursor along the y-axis on the monitor.

Figure 15:
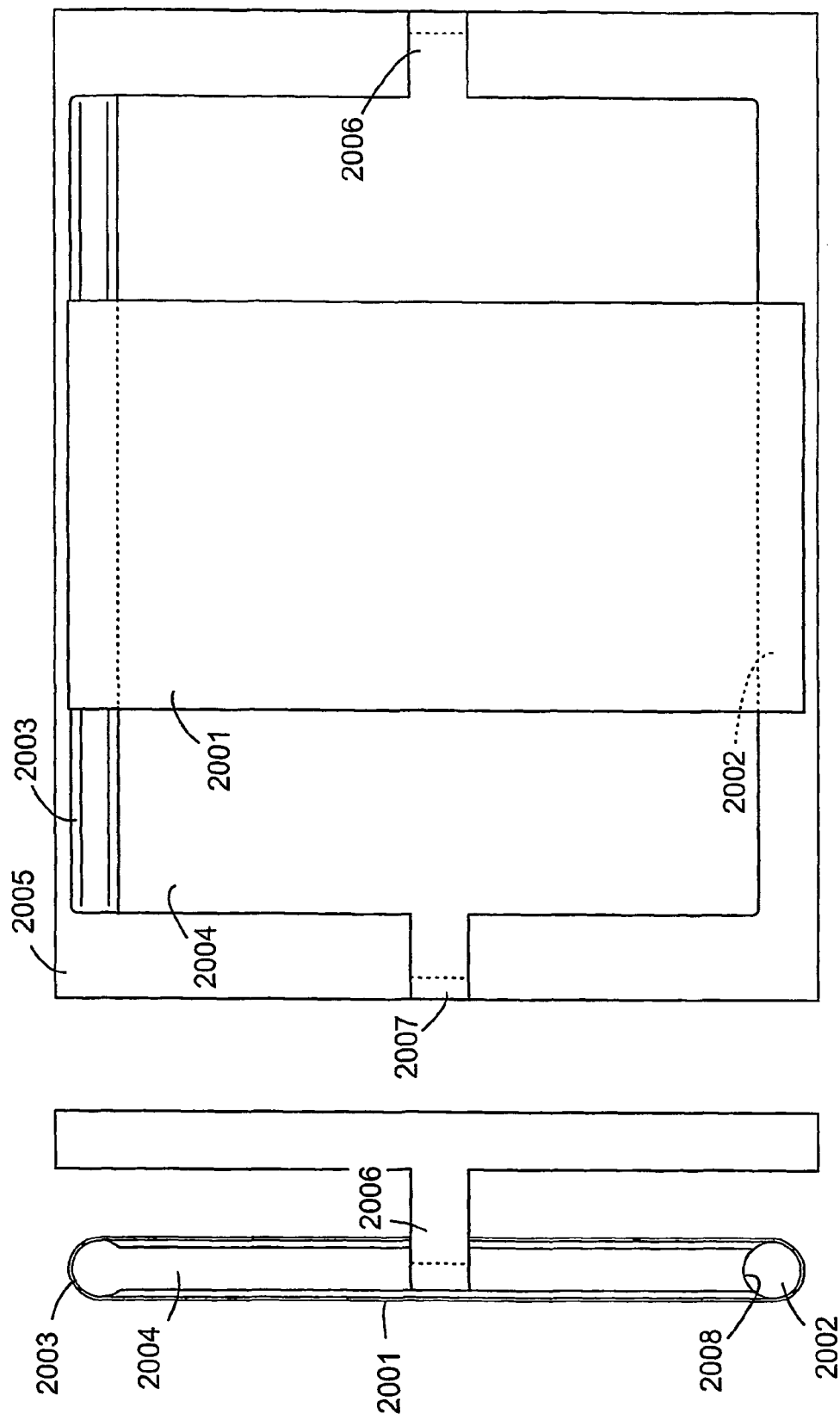

It is appropriate in most cases to use two rods around which the loop rotates, since in this case the force needed to displace the loop is minimised. In certain cases, however, it may be sufficient to use only one rod that can be translated and rotated, over which one end of the loop rotates while the second end of the loop passes over a fixed edge of the base plate. The rod may be mounted to slide relative to the base plate. An example of this mechanical construction is shown as association with a view from above in FIG. 15 and a view from the side in FIG. 15a.

A loop 2001 is mounted under tension between a highly polished rod 2002, executed in, for example, steel, and a rounded edge 2003 of a base plate 2004. The length of the rod 2002 should be at least as large as the length of the loop 2001. The base plate 2004, which is fixed attached to a base 2005 by the struts 2006 and 2007, has at one edge a concave groove 2008, in which the rod 2002 can slide and also rotate. The loop 2001 rotates around the rod 2002, which also rotates, when the user displaces the upper surface of the loop 2001, the "pointing surface" along the Y-axis relative to the base plate 2004. At the same time, the loop 2001 passes over the rounded edge 2003 of the base plate 2004.

The loop 2001 and the rod 2002 are translated as one unit along the X-axis when the user displaces the pointing surface along the X-axis relative to the base plate 2004. The loop 2001 in this embodiment is tangentially elastic, by which it is placed under tension around the rod 2002 and the rounded edge 2003 of the base plate 2004, such that play is eliminated.

It is clear that the rod 2002 can also be-mounted relative to the base plate 2004 in another manner, for example, by ball guides or similar.

Figure 17:
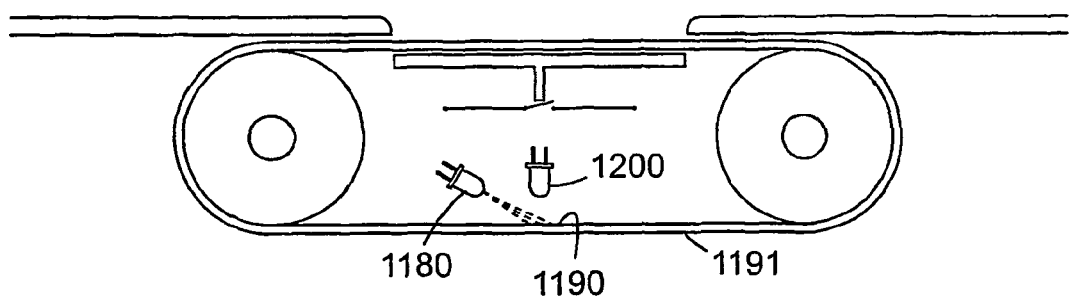
FIG. 17 shows a concept for detection of the motion of the loop.

Detection must be available for all embodiments, such that the movement of the pointing surface along the y-axis can be interpreted in order to give rise to motion of the cursor along the y-axis on the monitor and such that the motion of the loop along the x-axis can be interpreted to give rise to motion of the cursor along the x-axis on the monitor. One possibility is to use the technology that is used in Microsoft's "IntelleEye" optical mouses. These mouses can detect optoelectronically relative motion of the base underneath the mouse, independently of the appearance of the base. Such a device can also be used to detect motion of the loop, as is schematically shown in FIG. 17. The light-emitting diode 1180 illuminates a surface 1190 on the inner surface of the loop 1191. Detection optics 1200 detect the motion of the loop 1191.

Figure 18:
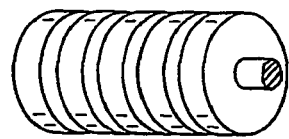
FIG. 18 shows schematically a shaft comprising several mutually rotatable axel elements.

Instead of extended rods, the rotatable/translatable shafts can, as is schematically shown in FIG. 18, also comprise several mutually freely rotatable and, where appropriate, translatable shorter shaft elements or wheels.

Although the description above has been limited to the displacement of a cursor on a monitor, certain computer programs can provide another function following input from a pointing device, for example displacement of the complete image (scrolling), displacement of a particular image, or zooming, etc. Such operations are included in the intention of the invention.

It may be appropriate for a device according to the invention to be executed as a "stand-alone" unit to be placed, for example, next to a conventional keyboard.

Naturally, a device according to the invention can also be used in combination with mobile telephones or with other equipment equipped with a monitor. Displacement of the pointing surface can, for example, be used for menu selection on the screen or for other purposes.

The invention claimed is:

1. A pointing device comprising:
   a base;
   a pair of support members arranged at a mutual distance on the base, with at least one of the support members being mounted for rotation about a rotation axis and axial movement parallel to the rotation axis;
   a belt member looped around said pair of support members for circulatory forwards and backwards motion in a first direction perpendicular to the rotation axis and for linear forwards and backwards motion in a second direction perpendicular to the first direction and parallel to the rotation axis, the belt member having an external face forming a pointing surface that is movable within a pointing area of the device by means of a finger or equivalent, whereby such movement of the pointing surface can effect corresponding movement of a cursor or equivalent on a display operatively connected to the pointing device; and wherein the belt member includes a plurality of rods extending parallel to the rotation axis for maintaining the shape of the pointing surface during movement of the pointing surface; and
   an optoelectronic sensor for detecting motion of the belt member.

2. The device according to claim 1, wherein at least one of the support members is arranged to be influenced by means that act to place the loop device under tension.

3. The device according to claim 2, wherein said means comprises spring means.

4. The device according to claim 2, wherein said means comprises magnetic means.

5. The device according to claim 1, comprising rollers and spring means arranged between the said support members, which means act to separate the said support members from each others with the loop device placed under tension between them.

6. The device according to claim 5, wherein at least two rollers are connected to spring means, which constitutes a connection between the rollers, and which acts to separate the rollers from each other.

7. The device according to claim 6, wherein said spring means is arranged principally in a C-shape.

8. The device according to claim 6, wherein said spring means is arranged principally in an S-shape.

9. The device according to claim 6, wherein said spring means consists of a spiral spring.

10. The device according to claim 6, wherein said spring means consists of a wire.

11. The device according to claim 5, wherein the rollers comprise spheres and/or cylinders.

12. The device according to claim 5, wherein the rollers comprise bodies in the form of barrels or ellipsoids.

13. The device according to claim 1, wherein said support members are arranged on a trolley that can be displaced in the second direction relative to the base.

14. The device according to claim 1, wherein at least one of said support means includes a shaft capable of being rotated and axially displaced relative to the base.

15. The device according to claim 1, wherein relatively adjacent rods are linked together for relative pivotal movement.

* * * * *